(12) United States Patent
Tønning et al.

(10) Patent No.: US 12,455,489 B2
(45) Date of Patent: Oct. 28, 2025

(54) ELECTROMAGNETIC RADIATION FREQUENCY CONVERTER AND LIGHT SOURCE COMPRISING THE SAME

(71) Applicant: UVL A/S, Åbyhøj (DK)

(72) Inventors: Peter Tønning, Åbyhøj (DK); Emil Z. Ulsig, Åbyhøj (DK); Eric J. Stanton, Åbyhøj (DK); Nicolas Volet, Åbyhøj (DK); Peter Johansen, Åbyhøj (DK)

(73) Assignee: UVL A/S, Åbyhøj (DK)

( * ) Notice: Subject to any disclaimer, the term of this patent is extended or adjusted under 35 U.S.C. 154(b) by 501 days.

(21) Appl. No.: 17/726,983

(22) Filed: Apr. 22, 2022

(65) Prior Publication Data

US 2022/0342275 A1    Oct. 27, 2022

Related U.S. Application Data

(60) Provisional application No. 63/178,619, filed on Apr. 23, 2021.

(51) Int. Cl.
*G02F 1/35* (2006.01)
*A61L 2/10* (2006.01)
(Continued)

(52) U.S. Cl.
CPC ............. *G02F 1/3503* (2021.01); *A61L 2/10* (2013.01); *G02F 1/3551* (2013.01); *G02F 1/37* (2013.01); *A61L 2202/11* (2013.01)

(58) Field of Classification Search
CPC .......................................... G02F 1/353–3548
See application file for complete search history.

(56) References Cited

U.S. PATENT DOCUMENTS 4,830,447 A * 5/1989 Kamiyama ............. G02F 1/377
                                                                    359/885
4,838,638 A * 6/1989 Kamiyama ............. G02F 1/377
                                                                    359/332
(Continued)

FOREIGN PATENT DOCUMENTS

JP       H 09197454        7/1997
WO       WO 91/12556 A1    8/1991
WO       WO 2020/095418 A1 5/2020

OTHER PUBLICATIONS

Danish Patent and Trademark Office; First Examination/Search Report for Application No. PA 2021 70186, dated Oct. 22, 2021 (9 pages).

(Continued)

*Primary Examiner* — Rhonda S Peace
(74) *Attorney, Agent, or Firm* — ICE MILLER LLP; Justin D. Swindells (57) ABSTRACT

An electromagnetic radiation frequency, or equivalent wavelength, converter, the converter including a nonlinear optical component or part having or consisting of a predetermined nonlinear optical material, and a guiding module. The guiding module has a predetermined geometry defining or controlling an effective refractive index of the guiding module, and is configured to receive and guide pump light resulting in a guided pump beam. The nonlinear component or part is bonded with or joined to the guiding module. The bonding is configured to allow at least a part of the guided pump beam to overlap and/or evanescently couple into the nonlinear optical material, and the nonlinear optical component or part is configured to convert the guided pump beam in the nonlinear optical material to an un-guided signal mode radiated as an output light signal at a different frequency or an equivalent wavelength.

12 Claims, 6 Drawing Sheets

(51) Int. Cl.
*G02F 1/355* (2006.01)
*G02F 1/37* (2006.01)

(56) References Cited

U.S. PATENT DOCUMENTS

| | | | |
|---|---|---|---|
| 4,896,933 A * | 1/1990 | Yano | G02F 1/377 |
| | | | 385/27 |
| 4,923,277 A * | 5/1990 | Okazaki | G02F 1/383 |
| | | | 359/328 |
| 5,013,129 A * | 5/1991 | Harada | G02B 6/122 |
| | | | 359/332 |
| 5,029,976 A * | 7/1991 | Goto | G02F 1/383 |
| | | | 359/328 |
| 5,854,870 A | 12/1998 | Helmfrid | |
| 5,987,041 A | 11/1999 | Taniguchi | |
| 2008/0151948 A1 | 6/2008 | Govorkov | |
| 2014/0251949 A1 | 9/2014 | Smeeton | |
| 2015/0303647 A1 | 10/2015 | Tokuhisa | |
| 2017/0246331 A1 | 8/2017 | Lloyd | |
| 2020/0073199 A1 | 3/2020 | Lin | |
| 2020/0285131 A1 | 9/2020 | Marandi et al. | |
| 2021/0226414 A1 | 7/2021 | Taisuke | |
| 2022/0342275 A1 * | 10/2022 | Tønning | G02F 1/3551 |

OTHER PUBLICATIONS

International Search Report for International Patent Application No. PCT/IB2021/058521, mailed Jan. 13, 2022 (4 pages).

Alnis, J. et al.; "Sum-frequency generation with a blue diode laser for mercury spectroscopy at 254 nm"; Appl. Phys. Lett., vol. 76, No. 10, pp. 1234-1236; American Institute of Physics, Melville, NY; Mar. 6, 2000; XP012024762; ISSN: 0003-6951; DOI: 10.1063/1.125994 (4 pages).

Carruthers, A. E. et al.; "Single-scan spectroscopy of mercury at 253.7 nm by sum frequency mixing of violet and red microlensed diode lasers"; Optics Communications, vol. 255, No. 4-6, pp. 261-266; Elsevier, Amsterdam, NL; Nov. 15, 2005; XP0276344324; ISSN: 0030-4018; DOI: 10.1016/j.optcom.2005.06.009 (9 pages).

International Search Report and Written Opinion of International Application No. PCT/EP2022/060725, mailed Aug. 1, 2022 (13 pages).

* cited by examiner

ELECTROMAGNETIC RADIATION FREQUENCY CONVERTER AND LIGHT SOURCE COMPRISING THE SAME

CROSS-REFERENCE TO RELATED APPLICATIONS

This application claims the benefit of and priority to U.S. Provisional Application No. 63/178,619, filed Apr. 23, 2021, which is incorporated herein by reference in its entirety.

FIELD OF THE INVENTION

The invention is related to the coherent generation of light through nonlinear optical processes. This enables conversion of laser light to other frequencies enabling generation of compact coherent light sources at a wavelength not widely available with existing lasers.

BACKGROUND OF THE INVENTION

With the ongoing Covid-19 pandemic the urgent need for sterilization methods has become clearer than ever. Light in the ultraviolet C-band (UVC) has proven effective for sterilizing the air, liquids, and surfaces. Further, in recent years it has been established that light at 207 and 222 nm is heavily absorbed in the outer layers of the skin and eye, and hence is potentially not harmful to mammals, including humans. While these two wavelengths have their origins in the available light sources the safety argument is true within the 190-230 nm region. This allows light in this spectral region to be used for germicidal purposes with humans and animals present. However, only a sparse selection of light-sources within this spectral range exists, and to this point there is no widely available and compact light sources, i.e., LEDs or lasers diodes in the 190-230 nm range.

OBJECTIVE OF THE INVENTION

An object of the invention is to provide devices and methods for converting the frequency, or equivalently the wavelength, of lasers to enable emission outside of the laser emission band. The frequency conversion is enabled in a compact manner, and with large conversion efficiency in particular enabled through a product design involving various fabrication methods within the field of integrated photonics.

SUMMARY OF THE INVENTION

One or more of the above-mentioned objects are obtained, at least to an extent, according to a first aspect by an electromagnetic radiation frequency, or equivalent wavelength, converter, the converter comprising
a nonlinear optical component or part comprising or consisting of a predetermined nonlinear optical material, and
a guiding module, the guiding module
having a predetermined geometry defining or controlling an effective refractive index of the guiding module, and configured to receive and guide pump light resulting in a guided pump beam,
wherein
the nonlinear component or part is bonded with or joined to the guiding module, where the bonding is configured to allow at least a part of the guided pump beam to overlap and/or evanescently couple into the nonlinear optical material, and
the nonlinear optical component or part is configured to convert the guided pump beam in the nonlinear optical material to an un-guided signal mode radiated as an output light signal at a different frequency or an equivalent wavelength.

Controlling the effective refractive index of the guiding module with respect to the refractive index of the signal light (output light signal) in the nonlinear optical component enables Cherenkov phase-matching at a corresponding/predetermined Cherenkov angle in relation to light received in the guiding module.

In some embodiments, the guiding module comprises at least one waveguide and the nonlinear component or part is surface bonded with or joined to the at least one waveguide of the guiding module (thereby 'sandwiching' the waveguide in-between the nonlinear component or part and the rest of the guiding module).

In some embodiments, the guiding module comprises
a substrate material, being different from the predetermined non-linear optical material, wherein the at least one waveguide is defined or deposited on a first side (i.e. the 'top') of the substrate material, or
a substrate material, being different from the predetermined non-linear optical material, and a buffer layer (i.e. at least one buffer layer) arranged, grown, or deposited on a first side (i.e. the 'top') of the substrate material and wherein the at least one waveguide is arranged or deposited on a first side (i.e. the 'top') of the ('topmost' if two or more buffer layers) buffer layer.

In some embodiments, the nonlinear optical component or part and/or the guiding module comprises embedded electrodes and is configured to respectively change the effective refractive index of the nonlinear optical component or part and/or the guiding module in response to a respective change in applied electric field to the embedded electrodes (i.e. via electro-optic effects).

In some embodiments, the converter comprises one or more planar optical structures configured to re-route, optically filter and/or modulate light received or to be received by the guiding module thereby controlling the output light signal.

In some embodiments, the predetermined nonlinear optical material is one selected from the group consisting of:
barium borate (BBO),
cesium lithium borate (CLBO),
lithium borate (LBO),
potassium dideuterium phosphate (KDP),
potassium dideuterium phosphate (DKDP),
ammonium dihydrogen phosphate (ADP), yttrium calcium oxoborate (YCOB), and
potassium fluoroboratoberyllate (KBBF).

In some embodiments,
the converter comprises an optical input coupler configured to receive light and provide it to the guiding module (for embodiments comprising at waveguide, the optical input coupler is configured to receive light and provide it to the waveguide), and/or
the guiding module is a guiding photonic integrated circuit. Photonic integrated circuits (PICs) are microchips that allow for guidance, generation, manipulation and detection of light in waveguides and optical elements that are typically formed through photolithography.

One or more of the above-mentioned objects are obtained, at least to an extent, according to a second aspect by a light source device, the light source device comprising at least one pump laser light source configured to emit light at a first predetermined wavelength, and an electromagnetic radiation frequency converter according the first aspect, wherein the guiding module of the frequency converter is configured to receive and guide at least a part of the emitted light from the at least one pump laser light source and the output light signal has a second predetermined wavelength different from the first predetermined wavelength.

One or more of the above-mentioned objects are obtained, at least to an extent, according to a third aspect by a germicidal or decontamination device, the germicidal or decontamination device comprising at least one light source device according to the second aspect, wherein at least one pump laser light source is configured to emit light configured to emit visible blue light and the output light signal is UVC or far-UVC light, e.g. or preferably having a wavelength of about 190 to about 230 nm, such as about 200 nm to about 230 nm, e.g. at or about 222 nm. While the invention is motivated by light generation in the 190-230 nm range, the novel approach of frequency conversion utilizing the presented design can enable light sources at other wavelengths as well.

One or more of the above-mentioned objects are obtained, at least to an extent, according to a third aspect by a method of electromagnetic radiation frequency, or equivalent wavelength, conversion comprising receiving and guiding pump light, by a guiding module having a predetermined geometry defining or controlling an effective refractive index of the guiding module, resulting in a guided pump beam, allowing, by a bonding between a nonlinear component or part, comprising or consisting of a predetermined nonlinear optical material, and the guiding module, at least a part of the guided pump beam to overlap and/or evanescently couple into the nonlinear optical material, and nonlinearly converting the guided pump beam in the nonlinear optical material to an un-guided signal mode radiated as an output light signal at a different frequency or an equivalent wavelength.

Further details and embodiments for and of each aspect are disclosed elsewhere herein.

In at least some embodiments, the device(s) comprises a pump laser system, an optical coupler, a guiding PIC, and a bonded nonlinear material. The pump laser comprises of one or more laser diodes, each generating one or more light beams. The optical coupler allows passing of the light beams from the pump laser system to the guiding module (e.g. or preferably in the form of a PIC. In the guiding module, light is guided in one or more waveguide structures. The guiding module is bonded to a nonlinear material allowing the light fields to overlap into the nonlinear material, so-called evanescent coupling. Through the nonlinear optical phenomenon of nonlinear conversion, a coherent output of light, the signal beam, is formed. For second order nonlinear processes the signal beam has the double, half, or summed frequency of the pump beam or beams, while higher order interactions enable even more elaborate frequency conversions such as four-wave mixing or generation of an optical frequency comb. The nonlinear interaction is maximized for a specific relation between the optical material parameters, tunable through the design of the optical waveguides in the guiding module under Cherenkov phase-matching. The converted light radiates into the nonlinear material at an angle that depends on the effective refractive index of the guided mode of the pump beam and the refractive index of the converted light in the nonlinear material. The combined device comprising a guiding module and the nonlinear material will be referred to as the "frequency converter", while the inclusion of a pump laser source makes a complete light source. To summarize, bonding nonlinear materials to PICs as disclosed herein readily enables an application of the nonlinear conversion utilizing Cherenkov phase matching, allowing for compact devices that convert laser light to wavelengths otherwise hard or impossible to obtain with existing laser technologies and in particular also in an economically viable way through mass production.

According to some embodiments of the light source, multiple lasers are combined before frequency conversion takes place. This combination of pump lasers can occur either in fiber, in a separate input coupler module or on the guiding module through planar optical circuitry. Combining multiple laser sources has two functions. First it allows for increased overall input power of the pump beam(s) improving both conversion efficiency and total output power at signal frequency(s). Second, the presence of multiple laser sources allows for sum-frequency generation (SFG) or difference-frequency generation (DFG) in the case where different pump frequencies are applied. This situation allows further extending the spectral range achievable for the signal frequency.

According to some embodiments of the light source, a single pump laser is split into multiple beams before frequency conversion takes place. This splitting of pump laser sources can occur for instance in fibers, with free-space optics, in a separate input coupler module or in the guiding module through planar optical circuitry. Splitting a single pump laser into multiple converter paths allows distributing the signal light to a larger area. In addition, in the case where the pump is depleted during the conversion process, it allows for shorter frequency converter sections.

According to some embodiments of the light source, an optical input coupler is added. This component could be made from a photonic integrated circuit allowing for spot-size conversion as well as splitting/combining the pump laser/lasers before coupling to the guiding module. Suitable PIC platforms should exhibit low loss guiding of visible light signals. Examples of suited platforms for guiding visible light needed for UVC generation are silicon nitride (Si3N4), tantala (Ta2O5), aluminum nitride (AlN) and alumina (Al2O3).

According to some embodiments of the light source, the pump laser diode is coupled directly to the frequency converter. This allows for a very compact device suitable for large-scale production. With the correct spacing, an entire array of lasers can be coupled to a corresponding array of frequency converting waveguides in the guiding module. This allows for either a single light source with very high power or for mass production of multiple light sources through dicing into separate bodies of lasers with converter modules.

According to some embodiments of the light source, the pump laser is coupled to the frequency converter using an optical fiber or an optical fiber-array. For proper coupling, the optical fibers could be tapered/lensed or have a small mode-field diameter. On the guiding module the waveguides can be designed to match the mode-profile of a given fiber-optic delivery system.

According to some embodiments of the frequency converter, the nonlinear material is periodically poled. Certain nonlinear materials allow for the periodic reversal of the domain orientation in the material, thereby changing the nonlinear coefficient. By periodically poling the nonlinear material the phase matching criterion is altered leading to a change in radiation angle and amplitude of the signal.

According to some embodiments of the frequency converter, the guiding module contains planar optical elements. Due to the foundation on standard optical integration platforms the guiding module could contain functionality beyond just waveguides. Example structures and their functions are listed in the following; however, this list only serves as indication of the potential and other structures could provide functionality to the surface bonded frequency converter presented herein. Multimode interference couplers could enable splitting and combining the pump light. Resonant structures such as ring resonators could enable spectral filtering of the pump beam or external stabilization of the pump laser. Tunable couplers and wavelength combiners could enable selective combination of different pump beams allowing for a configurable frequency converted output signal.

According to some embodiments of the light source, the guiding module contains resonant structures for providing feedback to the laser diode. This will allow for injection locking of the laser ensuring single frequency operation. By doing so a laser with broader emission can be used in the frequency converter since the guiding module has a built-in feedback forming an external cavity laser diode, resulting in a stabilized pump laser for the frequency conversion. Typical elements from PIC technology can be used to generate the frequency selective feedback, this could be but is not restricted to gratings on or around the waveguide, ring resonators or Fabry-Perot cavities.

According to some embodiments of the light source, the converted output signal is collimated using external optics. This will allow for high control of the spatial propagation of the light allowing for routing and/or manipulation of the light on its way to the intended application. Manipulations of the signal beam could be but are not limited to, intensity modulation and attenuation, splitting into several beams or focusing of the beam. Further, the distribution of the signal light could be achieved by diffusion either through transmission or reflection. Surface patterning or particle infusion allows for efficient diffusion of the laser signal to a larger beam angle.

According to some embodiments of the light source, the converted output signal is collimated and/or focused into an optical fiber. This optical fiber will, given proper material choice according to the signal wavelength, allow convenient and robust routing and manipulation of the generated laser-light.

According to some embodiments of the light source, the converted output signal is scattered on a reflective- or in a refractive-optical element. This would enable the light source to irradiate a bigger surface area for a given distance. Doing so would greatly increase the applicability of for instance UVC sources in germicidal use. An example of such light distributing mechanism could be a convex reflecting geometry, which, if placed correctly, could go into a combined but compact housing enclosing the entire laser, frequency converter and scattering body. The use of a reflector further enables beam scanning where the light distribution can be controlled with a motorized reflector.

According to some embodiments of the light source, the frequency converter module has electrodes embedded in the PIC and/or on the nonlinear material. Through electrooptic effects the refractive index can be tuned in both waveguide and nonlinear material. Given the nature of Cherenkov radiation, such tuning of the effective refractive index will result in a shift in emission angle. As such beam steering of the signal beam is enabled.

BRIEF DESCRIPTION OF THE DRAWINGS

FIG. 2), the nonlinear component (1) and the guiding module together forms an embodiment of a frequency converter (17) as disclosed herein. More particularly, the nonlinear component (1) is surface bonded with or jointed to one or more waveguides (2) of the guiding module. In some embodiments, the PIC has one or more buffer layers (4) between the substrate (5) and the waveguide (2). The figure illustrates the bonding only for a very limited cutout of the overall part to maintain resolvability of individual components (see e.g. also FIG. 6), however an advantage of the surface bonding approach is that it is routinely done on a much larger scale. Further indicated is a length (7) of the waveguide(s).

FIG. 6 schematically shows an embodiment of parallel fabrication and alignment of a plurality of complete light sources. Given that laser diodes typically are made as integrated devices in a process very similar to the fabrication process of the PIC in the frequency converter, the two components share similar feature size and overall build-structure, i.e. a functional layerstack (i.e. a laser diode active materials (14)) built upon a substrate material (i.e. a laser diode substrate material (15). This similarity is a significant enabler for a tight coupling between pump laser and frequency converter. Leveraging a unified pitch of the laser diode active materials (14) and of the respective waveguides (2) in the respective frequency converters, the optical alignment can be done for multiple devices/light sources simultaneously. Subsequent dicing between the waveguides readily facilitate large-scale manufacturing of multiple (hundreds or thousands) devices/light sources. In at least some embodiments, the laser output facets are butt-coupled directly to the waveguide facets on the frequency converters. The efficiency of the coupling can be optimized for instance by tapering the guiding module waveguide towards the facet to match the geometry of the laser emission region.

as shown in FIGS. 1-6) is placed in a TO-can (16). The TO-can (16) is a standardised packaging approach in the field of laser diodes and may be produced in high numbers at low prices even today. Complying to a standardised package enables compatibility with an entire range of current-supplies, fixtures, thermal management systems, etc.

DETAILED DESCRIPTION OF THE INVENTION

For the purpose of promoting an understanding of the principles of the invention, reference will now be made to the embodiment illustrated in the figures and specific language will be used to describe them. It will nevertheless be understood that no limitation of the scope of the invention is thereby intended. Such alterations and further modifications in the illustrated system, and such further applications of the principles of the invention as would normally occur to those skilled in the art are to be construed as being within the scope of the present invention.

It will be understood by those skilled in the art that the foregoing general description and the following detailed description are exemplary and explanatory of the invention and are not intended to be restrictive thereof.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more sub-systems or elements or structures or components preceded by "comprises . . . a" does not, without more constraints, preclude the existence of other, sub-systems, elements, structures, components, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this invention belongs. The system, methods, and examples provided herein are only illustrative and not intended to be limiting.

Figure 1:
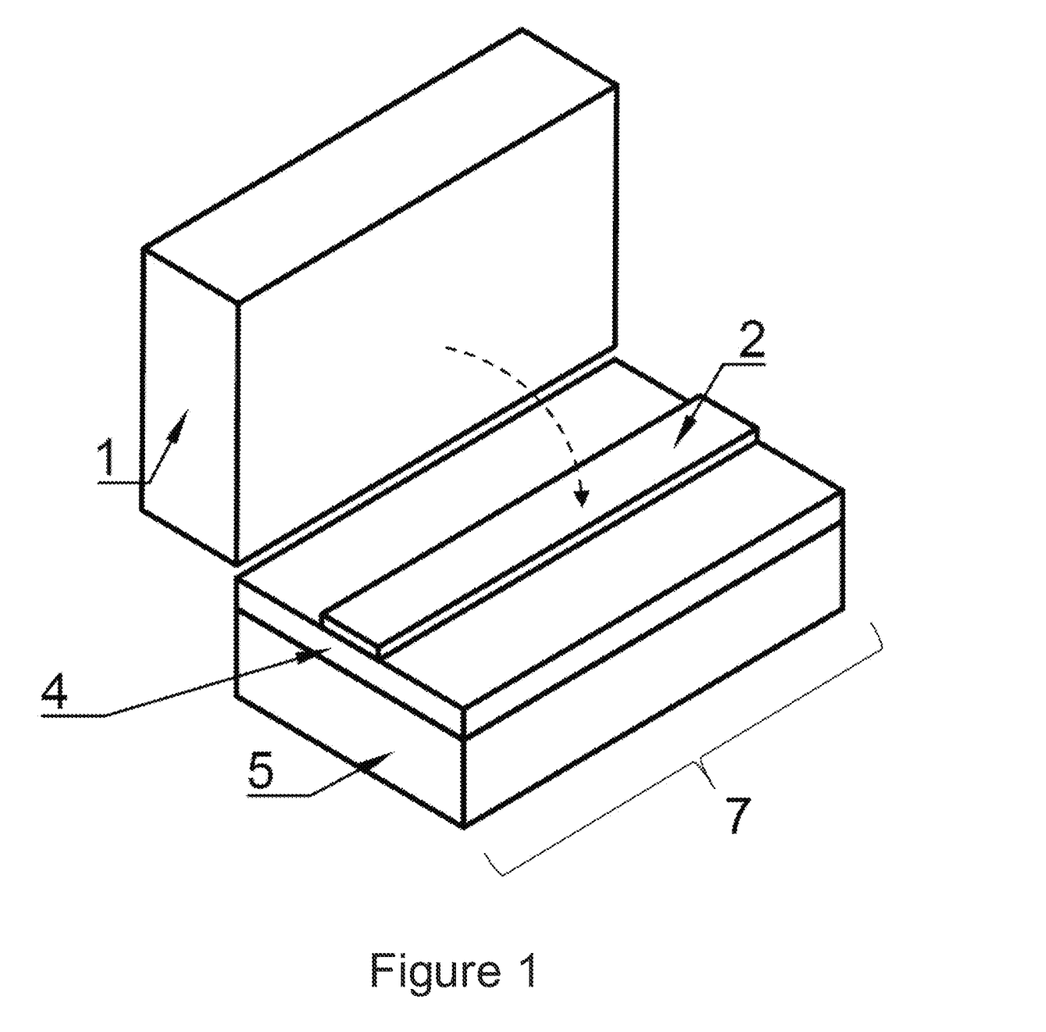
FIG. 1 schematically illustrates bonding (as indicated by the dashed arrow) of a nonlinear component (1) comprising nonlinear material to a guiding module PIC comprising one or more waveguide cores (2) on top of a substrate material (5) as disclosed herein. Once bonded (see e.g.
Figure 2:
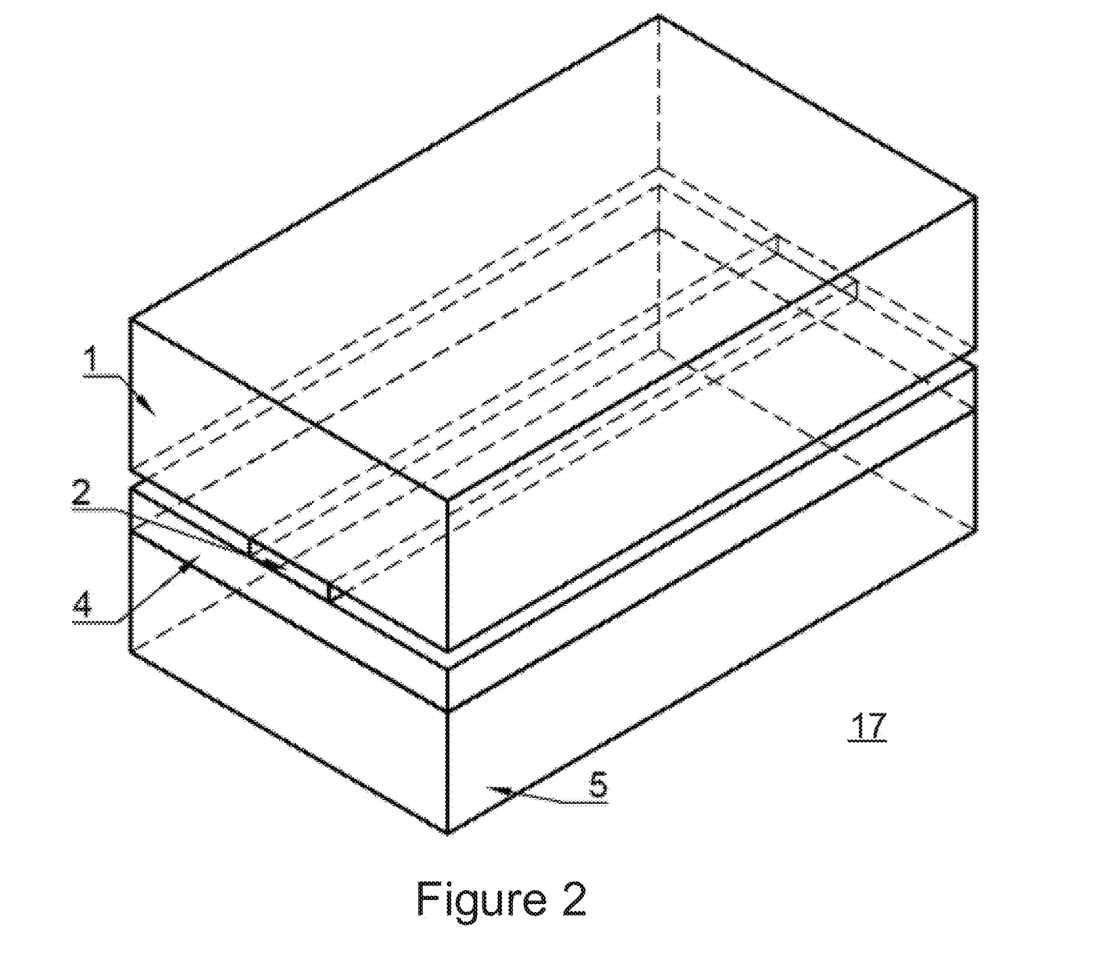
FIG. 2 schematically illustrates one embodiments of a frequency converter (17), as disclosed herein, after bonding. The frequency converter (17) comprises a nonlinear component or part (1) of a nonlinear material, at least one optical waveguide (2), a substrate (5), and in some further embodiments at least one buffer layer (4) then supporting the waveguide(s) (2). The buffer layer (4) may e.g. be oxide cladding. The frequency converter (17) function as disclosed herein, and in particular—at least in some embodiments—with respect to Cherenkov-enabled nonlinear conversion.
Figure 3A:
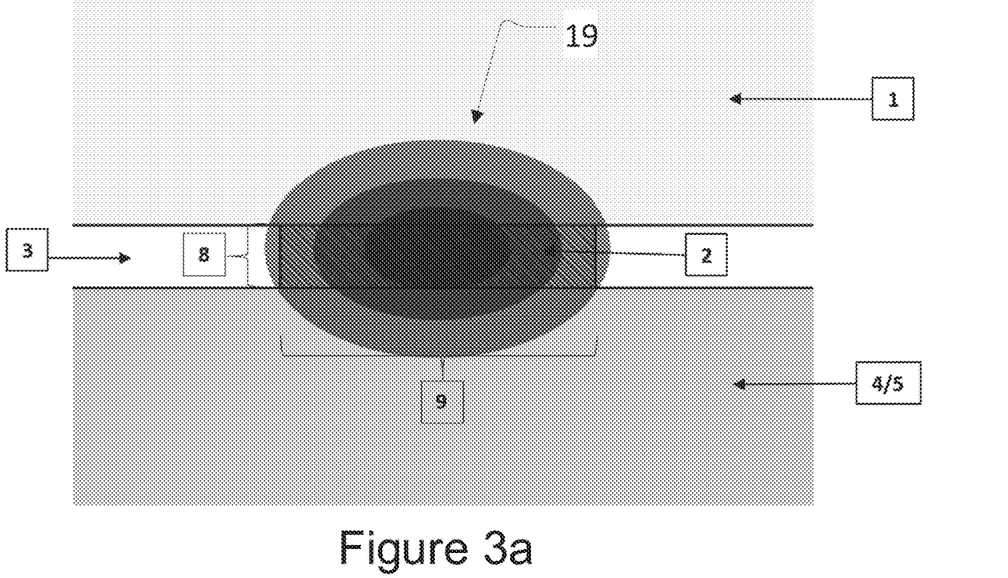
FIG. 3a schematically illustrate a cross-section of a frequency converter (e.g. of FIGS. 1 and 2) showing the cross-section of a waveguide (2) sandwiched between the nonlinear component (1) and the substrate (5) (or the buffer layer/oxide cladding (4) for such embodiments) of the guiding module. The cross-section is perpendicular to a length direction (see e.g. 7 in FIG. 1) of the waveguide (2). An optical mode profile is shown as a shaded overlay (19) as an example. The illustrated schematic optical mode profile is for a light source being or comprising a pump laser emitting a pump beam (see e.g. 11 in FIG. 4a). A height (8) of the waveguide (2) is illustrated that also generally defines the spacing between the nonlinear component (1) and the substrate (5) (or the buffer layer/oxide cladding (4)). To each other side of the waveguide (2) there is a cavity or similar (to the opposite sides of the waveguide (2) and between the nonlinear component (1) and the substrate (5)/the buffer layer/oxide cladding (4)) containing a surrounding cladding material (3), e.g. ambient air. Part of the optical power will overlap, i.e. evanescently couple, into the nonlinear material of the nonlinear component (1), allowing for frequency conversion through nonlinear interaction. The effective index and mode profile (19) of the pump beam is dependent on waveguide geometry (8 and 9). Note that both the nonlinear material and the substrate/buffer extends beyond the figure due to the minuscule waveguide dimensions.

In some embodiments, a device as disclosed herein is a light source that will emit in wavelengths derived from the pump laser in accordance to nonlinear conversion processes. Since one target application is generation of far-UVC light, the following will take this emission band as example. The overall concept and layout of the presented light source could be adjusted for application at other wavelengths by substitution of nonlinear material and adjustment of waveguide dimensions. The UVC light is generated from visible blue light through nonlinear interaction in the form of Cherenkov radiation. For second harmonic generation (SHG) and sum frequency generation (SFG) based on Cherenkov radiation the coherent nonlinear interaction is ensured through phase-matching at a specific angle in relation to the pump beam, see FIG. 4a. This nonlinear interaction is material dependent and present in nonlinear optical materials with nonzero second-order susceptibility. By bonding, see FIG. 1, such nonlinear material directly on top of the waveguides of the guiding module, the pump beam is guided by the waveguide core while having significant modal overlap into the nonlinear material, see FIGS. 3a and 3b. This approach ensures efficient and mature production of the guiding module and the nonlinear material followed by subsequent bonding of the two chips or two wafers. To make efficient miniaturized nonlinear optical devices a waveguide of small dimensions is crucial. The material composition of typical nonlinear optical materials makes processing and/or structuring the nonlinear component very difficult, making sub-μm features and processing impossible with current technologies. Further, beyond the formation of the waveguide the uniformity requirements in traditional nonlinear conversion approaches, on e.q. thickness and sidewall of the waveguide, is again beyond the capabilities of current fabrication techniques. With the Cherenkov Phase matching the requirements to uniformity is relaxed since slight variations transfer to a shift in output angle but not an abrupt decline in conversion efficiency. As such, the separate preparation of guiding module with highly detailed waveguide features and the nonlinear material with subsequent bonding is critical for the ease of fabrication.

The bonding process may be achieved with either direct or indirect bonding of the surface of the waveguide layer to the surface of the nonlinear crystal. For direct bonding, no other material is deposited or grown on either surface to enhance the bonding. In contrast, indirect bonding uses one or more intermediate materials deposited on one or both bonding surfaces to improve the bonding energy. Common interlayers used for indirect bonding include Al2O3, SiN, or SiO2 deposited by atomic layer deposition, chemical vapor deposition, electron-beam deposition, or sputtering. Other interlayers frequently used for indirect bonding include photosensitive polymers such as benzocyclobutene or SU-8 which is an epoxy-based negative photoresist. For direct bonding and for indirect bonding with thin inorganic layers, the bonding mechanism is generally categorized as hydrophobic or hydrophilic. The benefit of hydrophilic bonding is that lower temperatures are necessary compared to hydrophobic bonding. The hydrophilic bonding process starts with a surface activation process, usually done with O2 or N2 plasma in vacuum or by atmospheric plasma with metastable He. This leads to saturation of the surface with hydroxyl groups from reaction with the air or by rinsing with clean deionized water. Other water molecules generally bond to the hydroxyl group at this point. Next, the two surfaces are brought in contact and hydrogen bonds create an instantaneous attractive force. To further strengthen the bond, the two substrates are baked or annealed at an elevated temperature, usually between 100 C and 500 C, for an extended period of time, usually between 10 minutes and 48 hours. During the annealing process, water molecules diffuse away from the bonding interface to leave a stronger direct bond between the surfaces of each material with primarily oxygen atoms remaining between them. As mentioned earlier, the hydrophilic bonding process is ideal for bonding two dissimilar materials because the lower temperature requirement reduces the total change in size between the two substrates due the thermal expansion. This difference in size as the two materials change in temperature relative to the temperature when the bond was initiated (which is generally room temperature, but can also be at elevated or lower temperature) may cause the bond to fail and crack apart. So, the bonding anneal temperature and time is usually experimentally determined to maximize the bonding energy without causing the bond to fail by cracking apart.

The guiding module should be transparent at the pump wavelength and preferably have as low propagation loss as possible. Due to the bonding, where a very thin interlayer (relative to the wavelengths of light) or no interlayer is used to improve the bonding energy, the guiding module should have no top-cladding above the waveguides. The waveguide geometry allows for a tight confinement of the light, implying that a smaller effective mode area is achievable, resulting in a stronger electromagnetic intensity in the nonlinear material and thus a larger conversion efficiency compared to free space laser beams in bulk nonlinear materials. The guiding module can be made from well-established photonic integration platforms. For pump lasers in the blue suitable PIC platforms could be silicon nitride (Si3N4), tantala (Ta2O5), aluminum nitride (AlN) and alumina (Al2O3). Regardless of the platform chosen for the guiding module, the effective index of the waveguides can be tuned through the waveguide geometry, see FIG. 3a. For a given PIC platform, a suitable nonlinear crystal should be chosen to fulfill the requirement of refractive index for Cherenkov phase-matching at a propagation angle in the nonlinear crystal.

For signal generation in the UVC, the nonlinear material can be but is not limited to beta barium borate (BBO), cesium lithium borate (CLBO), lithium borate (LBO), potassium dideuterium phosphate (KDP), potassium dideuterium phosphate (DKDP), ammonium dihydrogen phosphate (ADP), yttrium calcium oxoborate (YCOB), or potassium fluoroboratoberyllate (KBBF). All these materials are transparent over part of the UVC and possess second-order susceptibility, allowing them to be used for processes such as SHG and SFG. In addition, a cladding material can also be deposited on top of the nonlinear material. This can be advantageous to protect the nonlinear material, especially since several of the nonlinear materials are highly hygroscopic, however such cladding should remain thin enough on the bonding surface as to allow significant modal overlap into the nonlinear material. A compatible cladding material could amongst others, be magnesium fluoride (MgF2). MgF2 is transparent for wavelengths down to 120 nm. It is not hygroscopic, allows for protecting the nonlinear material and is widely used as a material for protective and antireflective coating.

In the following paragraph some observations are made on the crystal symmetry and orientation, where BBO bonded to a guiding module of SiN on a silicon substrate is used as an example. For optimal bonding, the bonding surface of the nonlinear material should have a similar coefficient of thermal expansion as compared with the substrate of the guiding module. For BBO bonded to SiN on Si substrate, material parameters suggest that the bonding surface should be orthogonal to the primary optical axis of the nonlinear crystal, which happens to be the growth direction. For Cherenkov-SHG, it is required that the signal wave (In the UVC range) has a refractive index greater than that of the pump beam (visible blue range). This allows for some considerations on the BBO crystal-orientation in relation to the waveguide. As an example, BBO is a negative uniaxial: The ordinary refractive index is larger than the extraordinary refractive index, therefore the signal wave should be ordinary. Due to normal dispersion: smaller wavelengths have larger refractive index; the signal wave is in this case similarly preferred to be ordinary. The pump wave vector is collinear to the SiN waveguide, which is the direction of propagation of the pump. It is therefore in the ordinary plane of the BBO crystal. The angle theta between the principal crystal axis and the propagation vector of the pump is therefore fixed at 90 degrees. The pump field is TE polarized with respect to the SiN waveguide. The direction of the electric field is therefore parallel to the bonding interface, or orthogonal to the crystal axis. This implies that the pump field is an ordinary wave with respect to the BBO. The direction of the nonlinear electric polarization is given by the product of the nonlinear tensor (applied to BBO) and the 6-column nonlinear vector (applied to type-I SHG). From this the optimal angle for phi that will maximize the effective nonlinear d-tensor follows.

Figure 3B:
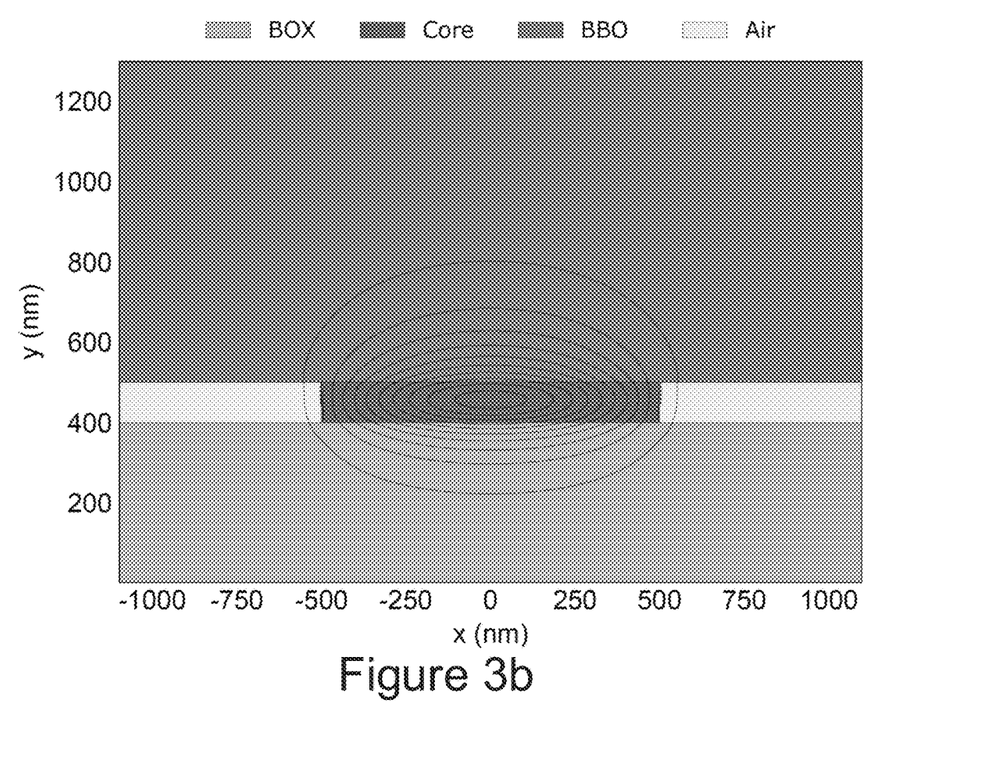
FIG. 3b shows a simulation of the electric field profile for the eigenmode of the pump light according to an example. The simulation is of a SiN waveguide core with a 100 nm height and 1000 nm width, adjacent to a BBO nonlinear component or part.
Figure 4A:
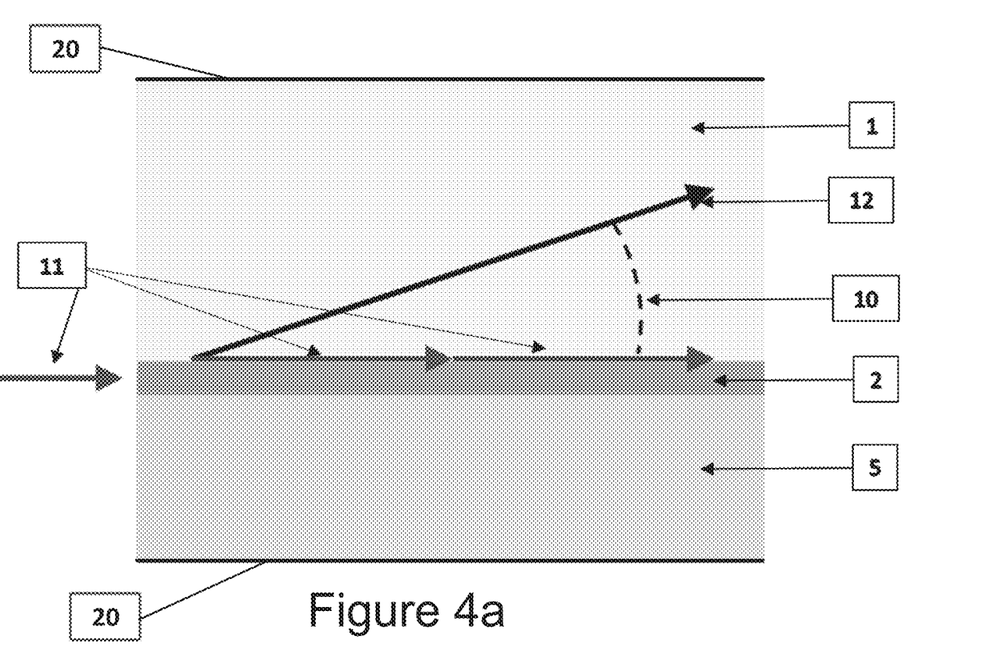
FIG. 4a schematically shows a sideview of the frequency converter exemplifying second harmonic generation (SHG) of a pump beam (11) emitted by a pump laser light source. The pump beam (11) is mostly confined in the waveguide core (2). However, the overlap into the nonlinear material (1) ensures SHG of a signal beam (12) at the Cherenkov angle (10) ensuring phase matching. The requirements of phase matching and energy conservation in the SHG process is indicated graphically through the length and direction of the arrows denoting the pump (11) and signal (12) beam. This figure shows only a part of the frequency converter along the length of the frequency converter, but SHG occurs continuously along the waveguide propagation axis.

A simulation of the electric field profile is shown in FIG. 3b for the eigenmode of the pump light using contour lines to indicate the normalized field strength. In this example, a SiN waveguide core with a 100 nm height and 1000 nm width is chosen to illustrate the point. The mode has a confinement factor in the SiN core of 59% and the evanescent part of the field has a confinement factor of 26% in the BBO. By varying the SiN waveguide height and width, the confinement of the pump light in the BBO can be tuned to optimize for phase matching and high conversion efficiency.

Figure 4B:
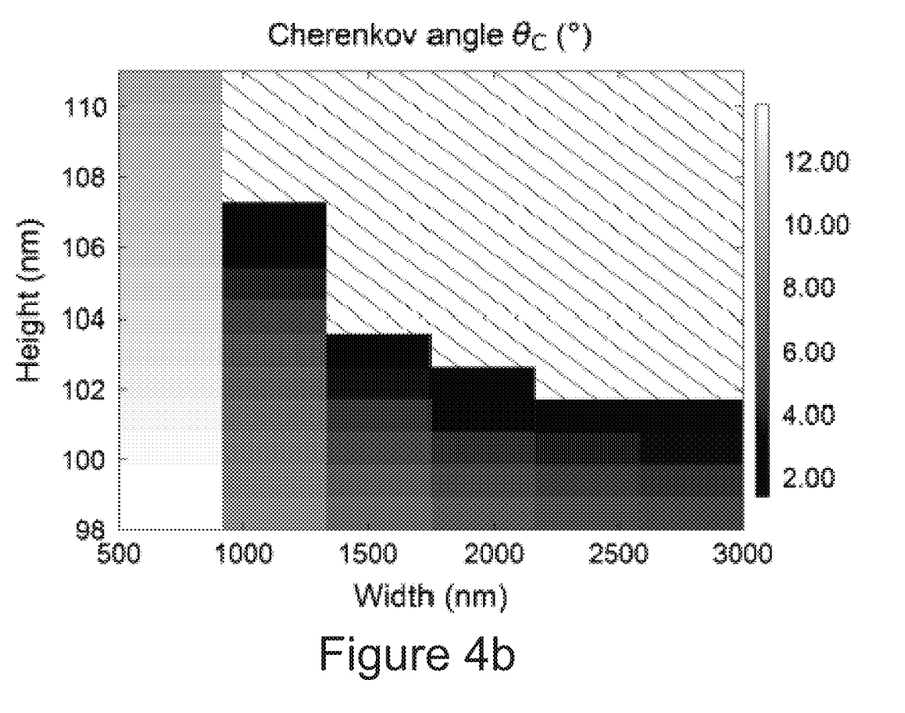
FIG. 4b shows how the Cherenkov angle changes for various combinations of SiN waveguide dimensions.

FIG. 4b shows how the Cherenkov angle changes for various combinations of SiN waveguide height and width. The Cherenkov angle ($\theta_C$) is determined from this relationship between the effective refractive index of the pump light eigenmode ($n_{eff}$) and the refractive index for TE polarized light at the signal wavelength in the BBO ($n_{BBO}$): $n_{BBO} \cos(\theta_C) = n_{eff}$. For this selection of SiN geometries, the Cherenkov angle varies from 0° to 13°.

Figure 5:
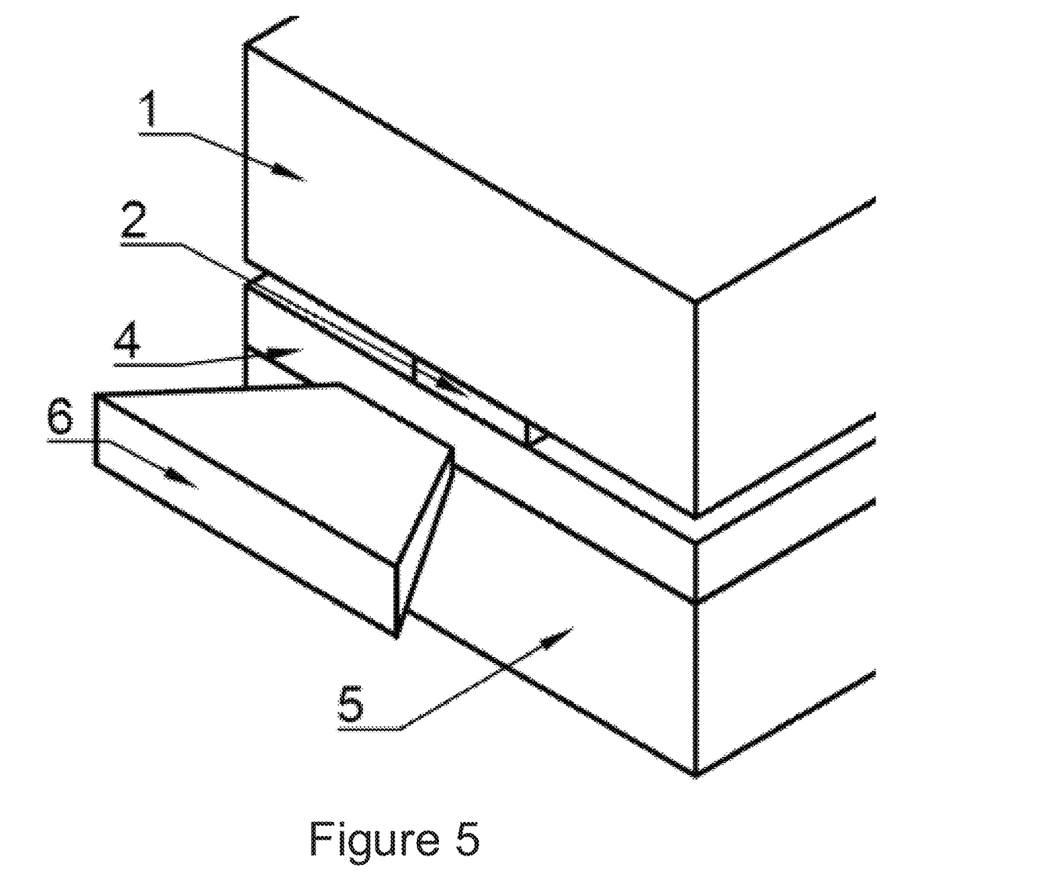
FIG. 5 schematically shows further embodiments, additionally comprising an optical input coupler (6). A suitable photonic integrated circuit (PIC) is used to slim down the size of the optical mode through tapering of the waveguide dimension within the optical input coupler (6). The input coupler (6) could further enable combination of multiple pump beams though integrated optical elements such as multimode interference couplers, y-branches, etc.

A number of N laser diodes provides N beams with either a single or multiple wavelengths. To combine the pump laser beams together, a PIC could be used as an optical input coupler, see FIG. 5. This PIC can be fabricated with silicon nitride, or aluminum nitride, or another available material that is transparent in the relevant wavelength ranges. This optical input coupler PIC facilitates matching of the optical modeprofiles and guiding them into the frequency converting module.

A number of N laser diodes are temperature controlled. By altering the temperature of the pump diode lasers, their wavelengths are shifted. The temperature of the nonlinear chip can also be changed to tune the Cherenkov angle. This allows for the generated UVC light to be shifted in both wavelength and output angle.

Figure 6:
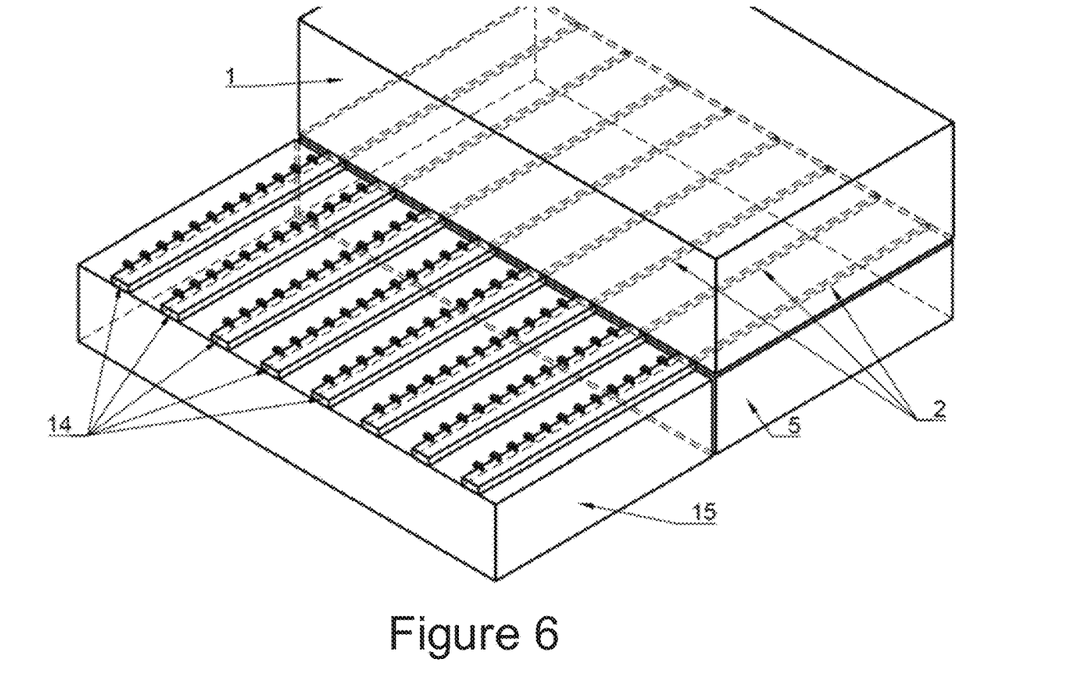
Figure 7:
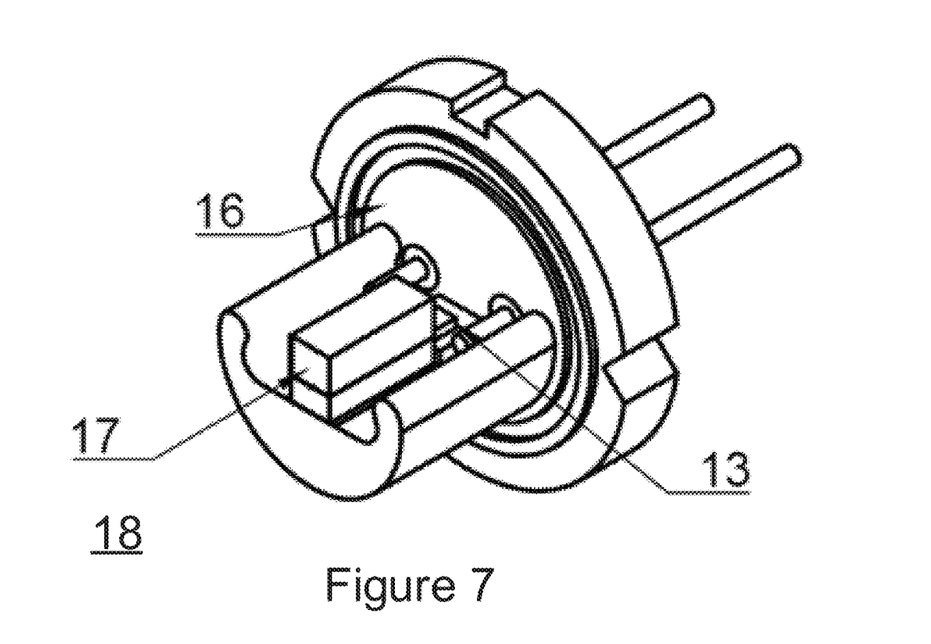
FIG. 7 schematically shows an example package of a compact light source/lighting device (18). In this example, a diode laser (13) and a frequency converter (17) (e.g.

The light source can be mass-produced since the pump laser and the PIC in the guiding module are both fabricated by wafer-scale lithography technology. As such arrays of lasers and frequency converting waveguides can be manufactured to have matching pitch, see FIG. 6. After bonding the nonlinear material to the guiding module PIC, the laser array can be aligned and fastened to the frequency converter and subsequently be diced into multiple complete light sources.

The invention claimed is:

1. An electromagnetic radiation frequency, or equivalent wavelength, converter, the converter comprising:
   a nonlinear optical component or part comprising or consisting of a predetermined non-linear optical material, and
   a guiding module, the guiding module
   having a predetermined geometry defining or controlling an effective refractive index of the guiding module, and
   configured to receive and guide pump light resulting in a guided pump beam,
   wherein:
      the nonlinear component or part is bonded with or joined to the guiding module, where the bonding or joining is configured to allow at least a part of the guided pump beam to overlap and/or evanescently couple into the nonlinear optical material, and
      the nonlinear optical component or part is configured to convert the guided pump beam in the nonlinear optical material to an un-guided signal mode radiated as an output light signal at a different frequency or an equivalent wavelength,
      wherein the converter is configured to enable Cherenkov phase-matching at a predetermined Cherenkov angle in relation to light received in the guiding module by controlling the effective refractive index of the guiding module with respect to a refractive index of the output light signal in the nonlinear optical component.

2. The electromagnetic radiation frequency converter according to claim 1, wherein the guiding module comprises at least one waveguide and the nonlinear component or part is bonded with or joined to the at least one waveguide of the guiding module.

3. The electromagnetic radiation frequency converter according to claim 2, wherein the guiding module comprises
   a substrate material, being different from the predetermined non-linear optical material, wherein the at least one waveguide is arranged or deposited on a first side of the substrate material, or
   a substrate material, being different from the predetermined non-linear optical material, and a buffer layer arranged or deposited on a first side of the substrate material and wherein the at least one waveguide is arranged or deposited on a first side of the buffer layer.

4. The electromagnetic radiation frequency converter according to claim 1, wherein the nonlinear optical component or part and/or the guiding module comprises embedded electrodes and is configured to respectively change the effective refractive index of the nonlinear optical component or part and/or the guiding module in response to a respective change in applied electric field to the embedded electrodes.

5. The electromagnetic radiation frequency converter according to claim 1, wherein the converter comprises one or more planar optical structures configured to re-route, optically filter, and/or modulate light received or to be received by the guiding module thereby controlling the output light signal.

6. The electromagnetic radiation frequency converter according to claim 1, wherein the predetermined nonlinear optical material is one selected from the group consisting of:
   barium borate (BBO),
   cesium lithium borate (CLBO),
   lithium borate (LBO),
   potassium dideuterium phosphate (KDP),
   potassium dideuterium phosphate (DKDP),
   ammonium dihydrogen phosphate (ADP),
   yttrium calcium oxoborate (YCOB), and
   potassium fluoroboratoberyllate (KBBF).

7. The electromagnetic radiation frequency converter according to claim 1, wherein the guiding module is a guiding photonic integrated circuit.

8. A light source device, the light source device comprising
   at least one pump laser/pump source configured to emit light at a first predetermined wavelength, and
   an electromagnetic radiation frequency converter according to claim 1,
   wherein the guiding module of the frequency converter is configured to receive and guide at least a part of the emitted light from the at least one pump laser light source and the output light signal has a second predetermined wavelength different from the first predetermined wavelength.

9. The light source device according to claim 8, wherein the converter comprises an optical input coupler configured to receive light and provide it to the guiding module.

10. The light source device according to claim 8, incorporated in a germicidal or decontamination device, wherein at least one pump laser light source is configured to emit visible blue light and the output light signal is UVC or far-UVC light.

11. The electromagnetic radiation frequency, or equivalent wavelength, converter according to claim 1, wherein the nonlinear optical component or part is configured to convert the guided pump beam in the nonlinear optical material to the un-guided signal mode, the un-guided signal mode being radiated at a predetermined angle with respect to the guided pump beam.

12. A method of electromagnetic radiation frequency, or equivalent wavelength, conversion comprising
   receiving and guiding pump light, by a guiding module having a predetermined geometry defining or controlling an effective refractive index of the guiding module, resulting in a guided pump beam,
   allowing, by a bonding between a nonlinear component or part, comprising or consisting of a predetermined nonlinear optical material, and the guiding module, at least a part of the guided pump beam to overlap and/or evanescently couple into the nonlinear optical material, and nonlinearly converting the guided pump beam in the nonlinear optical material to an un guided signal mode radiated as an output light signal at a different frequency or an equivalent wavelength, wherein the conversion is configured to enable Cherenkov phase-matching at a predetermined Cherenkov angle in relation to light received in the guiding module by controlling the effective refractive index of the guiding module with respect to a refractive index of the output light signal in the nonlinear optical component.

* * * * *